Oct. 11, 1966    K. C. EVANS    3,278,140
PURE FLUID AMPLIFIER AND PURE FLUID AMPLIFIER
ATTITUDE CONTROL SYSTEM FOR MISSILES
Filed Feb. 13, 1964    3 Sheets-Sheet 1

Kenneth C. Evans,
*INVENTOR.*

BY

Kenneth C. Evans,
INVENTOR.

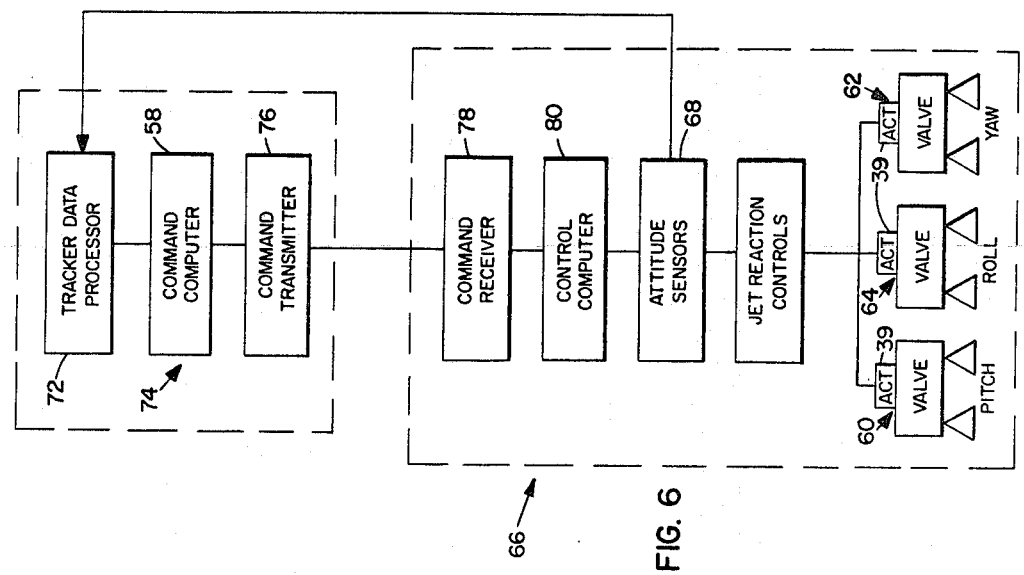
FIG. 6
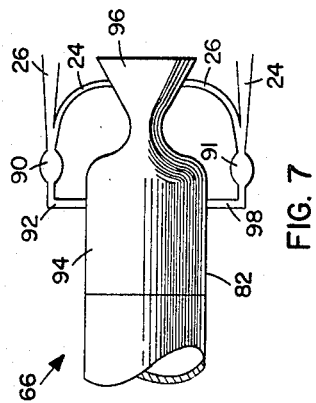
FIG. 7
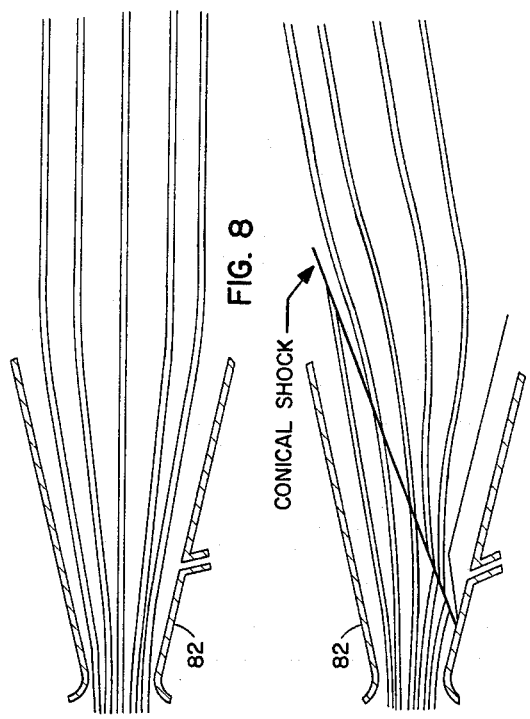
FIG. 8
FIG. 9
Kenneth C. Evans,
INVENTOR.

United States Patent Office 3,278,140
Patented Oct. 11, 1966

3,278,140
PURE FLUID AMPLIFIER AND PURE FLUID AMPLIFIER ATTITUDE CONTROL SYSTEM FOR MISSILES
Kenneth C. Evans, Montgomery, Ala., assignor to the United States of America as represented by the Secretary of the Army
Filed Feb. 13, 1964, Ser. No. 344,791
6 Claims. (Cl. 244—14)

The invention described herein may be manufactured and used by or for the Government for governmental purposes without the payment of any royalty thereon.

This invention relates to pure fluid amplifiers and particularly to mechanism disposed for diverting the direction of a fluid power stream by action of the fluid power stream itself.

There are many devices disposed for switching, controlling, deflecting, separating or otherwise redirecting a fluid power stream so that it may be utilized to perform a useful function. However, many of the devices have moving parts and require considerable force to open a duct once it is closed where high velocity of the stream is involved. Furthermore, most of these moving parts are positioned in the stream and the moving parts are, therefore, susceptible to corrosion and subsequent jamming.

There are other known fluid amplifiers in which a control stream of fluid is used to impinge on the sides of the fluid power stream, at or near a 90° angle therewith and the momentum of the control flow will cause the power jet to deflect. However, these devices require separate sources from which the control stream must be obtained.

The present invention overcomes such noted difficulties of diverting the stream by permitting the fluid power stream to create pressure differentials across the power jet itself and cause itself to be deflected. Mechanism of the present invention includes a body provided with an inlet disposed to receive a fluid power stream, a plurality of outlets and a chamber disposed intermediate the inlet and outlets for communication therebetween. A pair of offset control ports are each disposed on opposite sides of the chamber in communication therewith and the atmosphere. Means is provided to selectively open or close one of the ports to the atmosphere to create pressure differentials across the power tream to selectively divert the direction of fluid flow through a desired one of the outlets. There are no moving parts to be moved about in the stream and thus the problem of opening and closing ducts is eliminated. The problem of jamming of the moving parts due to corrosion, and the problem of requiring a separate control stream is eliminated.

The apparatus of the present invention may be utilized in such applications as pneumatic pickoffs for inertial sensing elements such as gyros and accelerometers. It also provides a simple means to convert electrical or mechanical energy to pnuematic energy as required in the valving of hot gas. The apparatus is particularly advantageous in the valving of hot gases in that no moving parts are exposed to the extreme environment of the hot gas.

A further advantage of the apparatus of the present invention is that no pressurized control medium is required in environments which approach standard atmospheric.

It is, therefore, an object of the present invention to provide a device for selectively directing a stream of fluid to one of a plurality of exit ports.

It is a further object of the present invention to provide a device for proportional and "on-off" control of the power jet of a pure fluid amplifier by differential pressures created across the power jet responsive to flow of the power jet.

It is a still further object of the present invention to provide such a device with means for creating the pressure differentials for selectively varying the direction of flow of the power jet.

It is a further object of the present invention to provide such a mechanism for attitude control of a space vehicle.

A yet further object of the present invention is to provide a device for selectively directing a stream of fluid to one of a plurality of exit ports for thrust vector control of a missile.

Other objects, features and advantages of the present invention will become more readily apparent from the following detailed description taken in conjunction with the accompanying drawings, in which:

FIGURE 6 is a schematic diagram of an attitude control system for a missile using the fluid amplifiers of the present invention;

FIGURE 7 is a view of a rocket motor using the fluid amplifier of the present invention as a means of achieving thrust vector control of a missile by a secondary injection;

FIGURE 8 illustrates the principles of a rocket thrust nozzle before secondary injection; and FIGURE 9 illustrates the phenomenon occurring in a rocket thrust nozzle during secondary injection.

Figure 1:
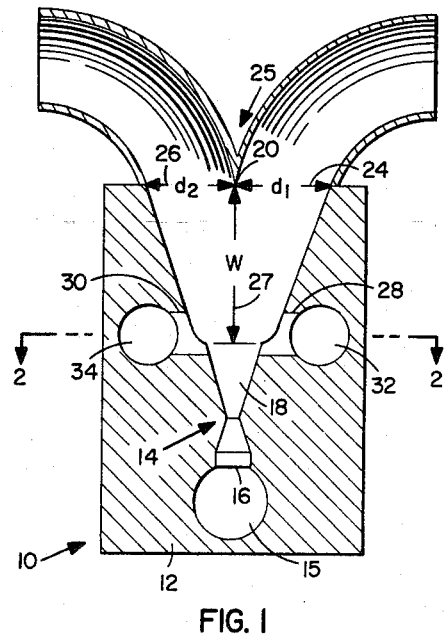
FIGURE 1 is a sectional plan view of the fluid amplifier of my invention including control ports through which a pressure differential is created across the power stream by flow of the power stream itself.
Figure 2:
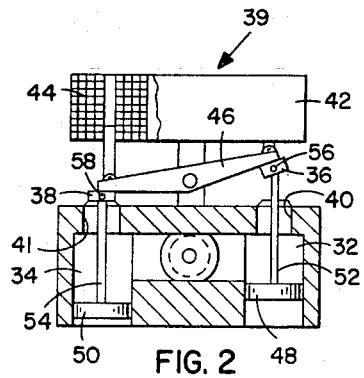
FIGURE 2 is a sectional view along line 2—2 of FIGURE 1 and further illustrates a means for selectively opening and closing the control ports to the atmosphere.

As shown in FIGURES 1 and 2 the fluid amplifier 10 includes a body 12 having a chamber 14 disposed therein. The fluid amplifier includes an inlet passageway 15 disposed for connection to a source of fluid under pressure. Chamber 14 includes an inlet nozzle 16 disposed in communication with passageway 15 and provided with an exit section 18. At a distance W from the exit section 18 of the nozzle is a splitter 20. Splitter 20 is provided with a leading knife edge 22 mounted directly on the center line with the nozzle exit section 18. A pair of exit ports 24 and 26 are open to the atmosphere at one end 25 of body 12. Ports 24 and 26 join at the edge 22 of the splitter to form a chamber 27 which extends to join nozzle exit section 18.

The nozzle is designed so that as the jet leaves exit section 18 it retains a width that is, at the distance W, less than $d_1$ or $d_2$—the diameter of the entrance portion of the exit ports 24 and 26 respectively.

A pair of offset orifices 28 and 30 are disposed in communication with chamber 27, on opposite sides thereof. Each of the orifices 28 and 30 have respectively disposed in communication therewith a pair of apertures 32 and 34. A pair of closure members 36 and 38 (FIGURE 2) are connected to an actuator 39 and are respectively movably mounted adjacent the open outer ends 40 and 41, respectively, of each of apertures 32 and 34. Actuator 39 is disposed to selectively close either of the openings 40 and 41 to the atmosphere.

The actuator 39 of the present invention provides a low power means to open and close the control ports of atmospheric controlled fluid amplifiers.

One advantage of the actuator is that the device utilizes a vacuum, created in one side of the fluid valve by the power jet itself, to assist in opening the control ports of the valve.

Actuator 39 is mounted on body 12 and includes a pair of solenoids 42 and 44, a flapper arm 46 pivotally mounted for reciprocal movement, and a pair of pistons 48 and 50, each respectively provided with connecting rods 52 and 54. The rods 52 and 54 are respectively pivotally secured to opposite ends 56 and 58 of flapper 46.

In operation, the fluid is admitted through the entrance passageway of the fluid amplifier 10 at a predetermined pressure. With ports 24 and 26 and apertures 32 and 34 open and the nozzle pressurized, flow occurs through the nozzle and impinges on the knife edge 22 of splitter 20, which is directly on the center line of the stream projected by the nozzle. As the stream flows from the exit section 18 of the nozzle and past the orifices 28 and 30, particles of air are entrained, tending to lower the pressure in these orifices; however, since these orifices are vented to the atmosphere at the open ends 40 and 41 thereof, the tendency for low pressure to exist in orifices 28 and 30 is alleviated and the power jet is divided into two streams of equal characteristics through ports 24 and 26.

To cause the power jet to move toward port 24 solenoid 44 is energized, moving the end 58 of flapper 46 upward and the end 56 of flapper 46 downward so that closure member 36 engages opening 40 to close-off aperture 32 to the atmosphere. With the actuator in this position and a fluid flowing through the fluid amplifier a vacuum is created in orifices 28 and 32. Since port 41 is open, the pressure in aperture 34 is near ambient and a differential pressure exists across the power jet causing it to move to port 24.

To cause the power jet to move from port 24 to port 26 it is only necessary to change (reverse) the position of the flapper. This is done by removing power from solenoid 44 and applying it to solenoid 42. The flapper then pivots the end 56 upward to open aperture 32 to the atmosphere. End 58 of flapper 46 is then pivoted downward for engagement of closure member 38 with opening 41 to close port 34 to the atmosphere. The fluid flow creates a vacuum in port 34 since port 40 is open to the atmosphere the pressure in aperture 32 is near ambient and a pressure differential exists to divert it to port 26.

It is to be understood that the particular actuator disclosed herein forms no part of the present invention and that the actuator is disclosed in a patent application filed by J. C. Dunaway, concurrently with the present application.

If desired, body 12 may be constructed so that the bottom thereof extends over the bottom portions of apertures 32 and 34 to prevent these apertures from communicating with the atmosphere through the bottom of body 12. Apertures 32 and 34 would, therefore, be left in communication with the atmosphere through openings 40 and 41 and other means, such as pistons, diaphragms, or other pressure to force transmitters, may be resorted to selectively open and close openings 40 and 41 to communicate apertures 32 and 34 to the atmosphere.

Figure 3:
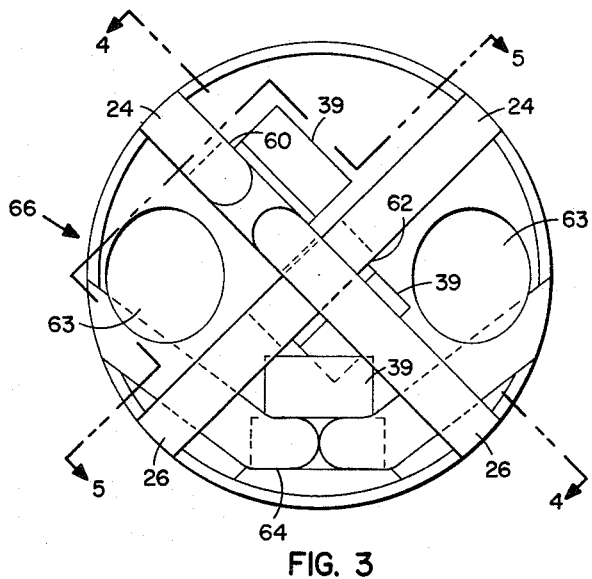
FIGURE 3 is an end view of a missile or rocket showing the main propulsion blast tubes and the attitude control nozzles of a missile utilizing the fluid amplifiers of the present invention for attitude control.
Figure 4:
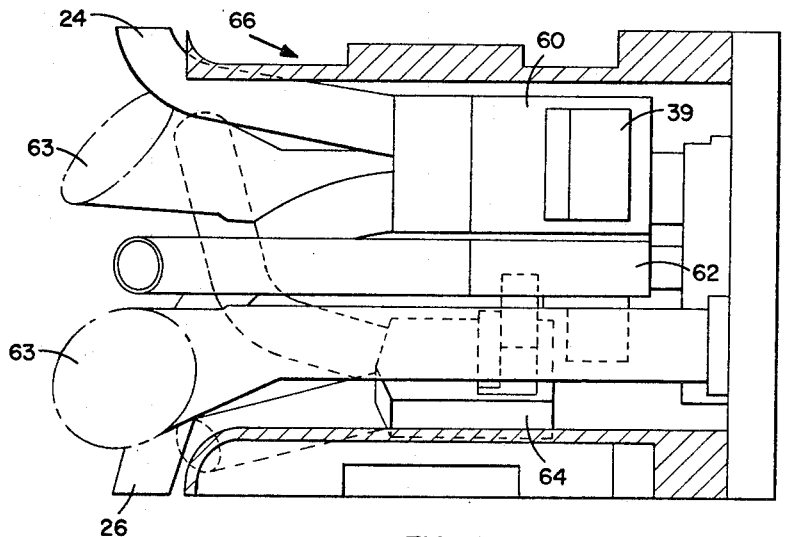
FIGURE 4 is a view along line 4—4 of FIGURE 3 showing both blast tubes and the positions of the pitch valve and ducting.
Figure 5:
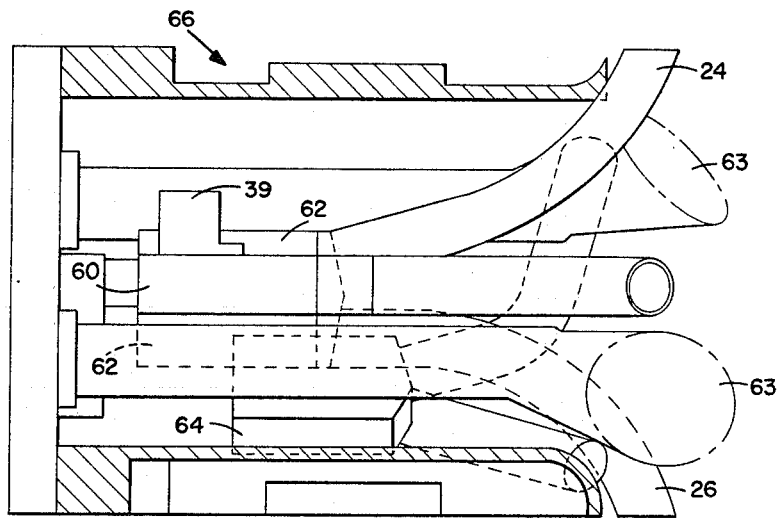
FIGURE 5 is a view similar to FIGURE 4 taken along line 5—5 of FIGURE 3 showing the portions of the yaw valve and ducting.

As shown in FIGURE 3 a plurality of valves 60, 62 and 64 are disposed in a missile or rocket 66 to apply jet reaction control forces thereto for attitude control of the missile. The missile is provided with a pair of blast tubes 63 through which the main propulsive forces are expelled. As illustrated in the FIGURES 3, 4, 5 and 6, valve 60 is used for pitch control, valve 62 for yaw control and valve 64 for roll control. Since hot gas is produced at a constant rate during flight, a Pulse Duration Modulation (PDM) is used so that the total gas flow will not be impeded at any time. Each valve has two positions and controls the flow of gas from inlet port 15 to either of outlet ports 24 and 26. In one position one outlet port is open and the other is closed. In the alternate position, the order is reversed. The gases are expelled out of the ports in rapid alternate order. This Pulse Duration Modulation control of the gas flow creates a PDM characteristic for control force application in the missile since the gas is exhausted through the two outlet ports to cause torques in opposite directions. The valve PDM is well above the missile's response frequencies so the missile tends to respond only to the net average force which will be in one direction or the other in the presence of non-zero command. Actuator 39 controls the direction of thrust through ports 24 and 26. When used in a missile for pitch control, the gas is exhausted thru ports 24 and 26 of valve 60 first upward and then downward through a repetitive cycle. The yaw control valve 62 operates in similar lateral fashion. The roll control system is arranged so that the exhaust nozzles 24 and 26 of valve 64 provides alternately, either a clockwise or counterclockwise roll couple without introducing extraneous pitch or yaw forces. When the missile is on course a gas generator (not shown) delivers an essentially constant rate of hot gas flow to the valve assembly. If the missile should deviate from its intended flight path, the individual valves are automatically commanded to proportion a greater percentage of the time cycle to the appropriate nozzle and therefore to generate a timewise integrated command force to return the missile to its intended flight path. The control system also accepts commands from the on-board gyros to augment missile stability and aid in resisting disturbances and to maintain the missile in the proper roll attitude. In such manner, the missile is automatically guided to the target.

As shown in FIGURE 6, the attitude control system for missile 66 includes attitude sensors 68 which sense any deviation of a space vehicle relative to its pitch, roll and yaw axes from its three desired attitudes as determined by its programming device or tracker data processor 72. The sensors transmit a signal proportionate to the amount of deviation of the missile from the desired trajectory. The signal is received by apparatus external to the missile, such as a tracker data processor 72 which transmits a signal proportionate to the attitude of the missile to a computer 74 for a comparison with a reference signal, the computer then determines the amount of the deviation and the axis or combinations thereof in which the deviations occur. A corrective signal is then transmitted from the computer through command transmitter 76 to a receiver 78 carried on board missile 66. Receiver 78 relays the signal to control computer 80 for decoding and transmission to the jet reaction controls for energization of the desired actuator. The actuator then controls the flow of the gas through the desired valve to maintain the missile in the proper attitude.

The program device may be one of several known types, comprising a timing device, preset instruments and/or radar control means. The attitude sensors may comprise, for instance, gyroscopic or other known type accelerometers.

A further application of the fluid amplifier of the present invention is found in secondary injection thrust vector control of missiles.

The application is illustrated in FIGURES 7, 8 and 9. As shown in FIGURE 7, the missile 66 is shown to include a rocket motor 82 having a pair of fluid amplifiers 90 and 91 mounted adjacent thereto. A conduit 92 is disposed in communication with the combustion chamber 94 of missile 66 and the passageway 15 of fluid amplifier 90 and nozzle 24 of the fluid amplifier is disposed in communication with the thrust nozzle 96 of missile 66. Nozzle 26 of the fluid amplifier is left to exhaust to the atmosphere to supply additional thrust to missile 66.

Fluid amplifier 91 is mounted adjacent motor 82 on the side opposite amplifier 90. A conduit 98 is disposed in communication with the combustion chamber 94 of missile 66 and passageway 15 of fluid amplifier 90 and nozzle 26 of fluid amplifier 91 is disposed in communication with the thrust nozzle 96 of missile 66. Nozzle 24 of fluid amplifier 91 is left to exhaust to the atmosphere to supply additional thrust to missile 66.

The use of secondary injection provides several advantages over conventional control schemes, such as a higher response rate, increased torque arm and no flexible lines are required.

The aerodynamic phenomenon that results in thrust vectoring is illustrated in FIGURES 8 and 9. In effect when a fluid is injected into the exhaust cone of a rocket engine, the injection forms a fluid wedge at the point of injection. An oblique shock wave is created, the angle and strength of which are functions of the injectant angle, type, and flow. In passing this shock front, the exhaust stream is turned by the pressure build up behind the front. This increased pressure, acting on the nozzle walls, produces side thrust.

It is to be understood that various specific embodiments disclosed are merely illustrative of the general principles of the invention and that various modifications may be resorted to that are in the spirit and scope of the appended claims.

I claim:

1. In a missile disposed for flight in a trajectory ending in a target, said missile provided with control apparatus to maintain the missile in the trajectory comprising:
   (a) mechanism for detecting the attitude of the missile and for providing a signal representative of said attitude,
   (b) means providing an error signal representing the difference between said attitude signal and a predetermined attitude reference signal,
   (c) a gas generator carried by said missile and disposed to produce gas at a constant rate during flight of said missile,
   (d) fluid amplifier means carried by said missile in communication with said gas generator, said fluid amplifier means including an inlet disposed to receive said gas from said gas generator, a chamber disposed in said amplifier in communication with said inlet, a pair of outlets communicating with said chamber for expulsion of said gas therefrom, and control means for selectively opening opposite sides of said chamber to the atmosphere to admit atmospheric pressure into said chamber to create pressure differentials across said gas flow and thus direct said gas through a preselected one of said outlets to control yaw, pitch and roll attitude of said missile.

2. Apparatus as in claim 1 with said fluid amplifier control means including:
   (a) a pair of orifices each positioned on opposite sides of said chamber and disposed in communication therewith,
   (b) means for selectively varying the openings of each of said orifices for varying the pressure across said gas flow to control the direction of flow thereof.

3. Apparatus as in claim 1 wherein said missile is provided with a nozzle for expelling thrust producing gases therefrom;
   (a) a conduit disposed in communication with said gas generator and said inlet of said fluid amplifier means and disposed for passage of gases to said inlet,
   (b) one of said outlets disposed in communication with said nozzle to provide secondary injection of said gases therein for impingement thereof against said thrust producing gases for varying the direction of flow of gases from said nozzle for control of said missile in the trajectory, and
   (c) the other of said outlets of said fluid amplifier means disposed in communication with the atmosphere to provide additional thrust to said missile.

4. A fluid amplifier comprising:
   (a) a fluid manifold chamber having inlet means supplied with a fluid under pressure;
   (b) a plurality of outlets disposed in communication with said manifold chamber;
   (c) a pair of control ports each disposed on opposite sides of said manifold chamber in communication therewith and the atmosphere;
   (d) means for closing off a first of said control ports to the atmosphere while maintaining the second said control ports in communication with the atmosphere and said manifold chamber to permit atmospheric pressure to enter therein and thus create a differential pressure across said fluid flow, and said fluid flow disposed for entrainment of particles from the closed port to create a vacuum therein and thus enhance the pressure differential across said fluid flow.

5. A fluid amplifier as in claim 4 including a pair of apertures disposed on opposite sides of said chamber in normal relation thereto and a pair of control ports positioned in normal relation to said apertures and disposed in communication with the atmosphere.

6. A fluid amplifier as in claim 5 wherein said fluid manifold chamber includes a nozzle section disposed in communication with said inlet.

References Cited by the Examiner

UNITED STATES PATENTS

| | | | |
|---|---|---|---|
| 3,135,291 | 6/1964 | Kepler et al. | 60—35.54 X |
| 3,143,856 | 8/1964 | Hausmann | 60—35.54 |
| 3,156,436 | 11/1964 | White | 244—14 |
| 3,210,937 | 10/1965 | Perry | 102—50 X |

FOREIGN PATENTS 1,283,184  12/1961  France.

BENJAMIN A. BORCHELT, *Primary Examiner.*

M. F. HUBLER, *Assistant Examiner.*